United States Patent
Gaspar et al.

(10) Patent No.: US 11,378,152 B1
(45) Date of Patent: Jul. 5, 2022

(54) HYDRAULIC BUSHING WITH INTERNAL SNUBBER

(71) Applicant: The Pullman Company, Milan, OH (US)

(72) Inventors: Zoren E. Gaspar, Huron, OH (US); Scott W. Rawlings, North Ridgeville, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 17/126,680

(22) Filed: Dec. 18, 2020

(51) Int. Cl.
*F16F 13/14* (2006.01)

(52) U.S. Cl.
CPC .................................. *F16F 13/14* (2013.01)

(58) Field of Classification Search
CPC ..... F16F 13/14; F16F 13/1409; F16F 13/1463
See application file for complete search history.

(56) References Cited

U.S. PATENT DOCUMENTS

| | | | |
|---|---|---|---|
| 5,657,510 A * | 8/1997 | Satori | F16F 13/14 16/2.2 |
| 7,845,624 B2 * | 12/2010 | Endo | F16F 13/1463 267/140.12 |
| 7,866,639 B2 * | 1/2011 | Endo | F16F 13/14 267/140.12 |
| 10,184,512 B2 * | 1/2019 | Palluck | F16C 33/64 |
| 10,359,091 B2 * | 7/2019 | Satou | F16F 1/38 |
| 2007/0273076 A1 * | 11/2007 | Endo | F16F 13/1463 267/292 |
| 2013/0164077 A1 | 6/2013 | Kondor | |
| 2017/0299008 A1 * | 10/2017 | Satou | B60G 11/22 |
| 2018/0087567 A1 * | 3/2018 | Palluck | F16C 33/664 |

(Continued)

FOREIGN PATENT DOCUMENTS

| | | |
|---|---|---|
| DE | 102006052918 B4 | 12/2012 |
| DE | 102008058239 B4 | 12/2014 |

(Continued)

OTHER PUBLICATIONS

International Search Report and Written Opinion regarding International Application No. PCT/US2021/057194, dated Feb. 18, 2022.

*Primary Examiner* — Thomas W Irvin
(74) *Attorney, Agent, or Firm* — Harness, Dickey & Pierce, P.L.C.

(57) ABSTRACT

A hydraulic bushing assembly comprises an inner tube, a travel limiter surrounding the inner tube, a first intermediate insert, a second intermediate insert spaced apart from the first intermediate insert, and an elastomeric bushing disposed around the inner tube and encapsulating the first intermediate insert and the second intermediate insert. The elastomeric bushing at least partially encapsulates the travel limiter such that a portion of the elastomeric bushing is positioned between the travel limiter and the inner tube. First and second snubbers limit displacement of the travel limiter and define first and second fluid chamber within the elastomeric bushing. A fluid passageway defined by the elastomeric bushing and an outer tube extends between the first and second fluid chambers, wherein relative movement between the inner tube and the outer tube causes fluid transfer between the first fluid chamber and the second fluid chamber.

19 Claims, 5 Drawing Sheets

(56) References Cited

U.S. PATENT DOCUMENTS

2019/0186586 A1* 6/2019 Klettke .............. F16F 13/1481
2020/0362938 A1* 11/2020 Kojima .............. F16F 13/1481

FOREIGN PATENT DOCUMENTS

| | | |
|---|---|---|
| DE | 102017120321 B3 | 12/2018 |
| EP | 1770303 A1 | 4/2007 |
| EP | 1611367 B1 | 10/2008 |
| EP | 2189678 A2 | 5/2010 |
| EP | 2672137 A1 | 12/2013 |
| KR | 100974593 B1 | 8/2010 |

\* cited by examiner

HYDRAULIC BUSHING WITH INTERNAL SNUBBER

FIELD

The present disclosure relates to a hydraulic bushing. More particularly, the present invention relates to a hydraulic bushing with an internal snubber.

BACKGROUND

The statements in this section merely provide background information related to the present disclosure and may not constitute prior art.

Hydraulic bushings typically used in automobile suspensions are expected to damp low frequency, large displacement, oscillations as well as contribute to high frequency acoustic isolation from relatively small displacements. Hydraulic bushings typically have two hydraulic chambers connected by a channel. The resonance of the fluid in the channel creates a mass damper effect. A compliant travel limiter is utilized in some designs to improve the durability of the bushing by transferring high loads from an inner tube to an outer tube through the travel limiter instead of the elastomeric bushing.

Challenges arise regarding packaging a compliant travel limiter into a hydraulic bushing application that has high load carrying capabilities. Compliant travel limiter construction may include injection molding a rubber pad to inner components that will transfer the load to an outer component. Durability of the rubber pad may be a concern due to residual tensile stresses arising at the completion of the injection molding process. Additional challenges may arise pertaining to the contact surface area between rubber and adjacent components within the hydraulic bushing. Known travel limiter designs may experience undesirably high loads during operation which may increase the likelihood of tears in the rubber.

SUMMARY

Further areas of applicability will become apparent from the description provided herein. It should be understood that the description and specific examples are intended for purposes of illustration only and are not intended to limit the scope of the present disclosure.

A hydraulic bushing assembly comprises an inner tube including an outer surface, an outer tube circumscribing the inner tube, a travel limiter fixed to the inner tube, an elastomeric bushing bonded to an outer surface of the travel limiter, a snubber assembly positioned within the outer tube and spaced apart from the travel limiter when the bushing is in an unloaded state. The travel limiter is operable to move into contact with the snubber assembly when the bushing is in a loaded state. The snubber assembly includes an outer snubber and a spaced apart inner snubber interconnected with an elastomeric cushion. The outer snubber includes a frame surrounding a window and in contact with the outer tube. The cushion extends through the window and the inner snubber is aligned with the window. The hydraulic bushing further comprises first and second fluid chambers and a fluid passageway defined by the elastomeric bushing and the outer tube. The fluid passageway extends between the first and second fluid chambers. Movement of the inner tube relative to the outer tube causes fluid transfer between the first fluid chamber and the second fluid chamber.

In another aspect, a hydraulic bushing assembly comprises an inner tube, a travel limiter surrounding the inner tube, a first intermediate insert, a second intermediate insert spaced apart from the first intermediate insert, an elastomeric bushing disposed around the inner tube and including a first flange encapsulating the first intermediate insert and a second flange encapsulating the second intermediate insert. The first and second flanges are spaced apart a first distance when the elastomeric bushing is in an unloaded, free state. An outer tube circumscribes the elastomeric bushing. The elastomeric bushing and the outer tube at least partially define first and second fluid chambers. The first and second flanges are spaced apart a second distance less than the first distance when compressed within an axial extent of the outer tube. The hydraulic bushing further comprises a snubber spaced apart from the travel limiter and positioned in the outer tube to limit displacement of the travel limiter. A fluid passageway extends between the first and second fluid chambers such that movement of the inner tube relative to the outer tube causes fluid transfer between the first fluid chamber and the second fluid chamber.

DRAWINGS

The drawings described herein are for illustration purposes only and are not intended to limit the scope of the present disclosure in any way.

DETAILED DESCRIPTION

Figure 1:
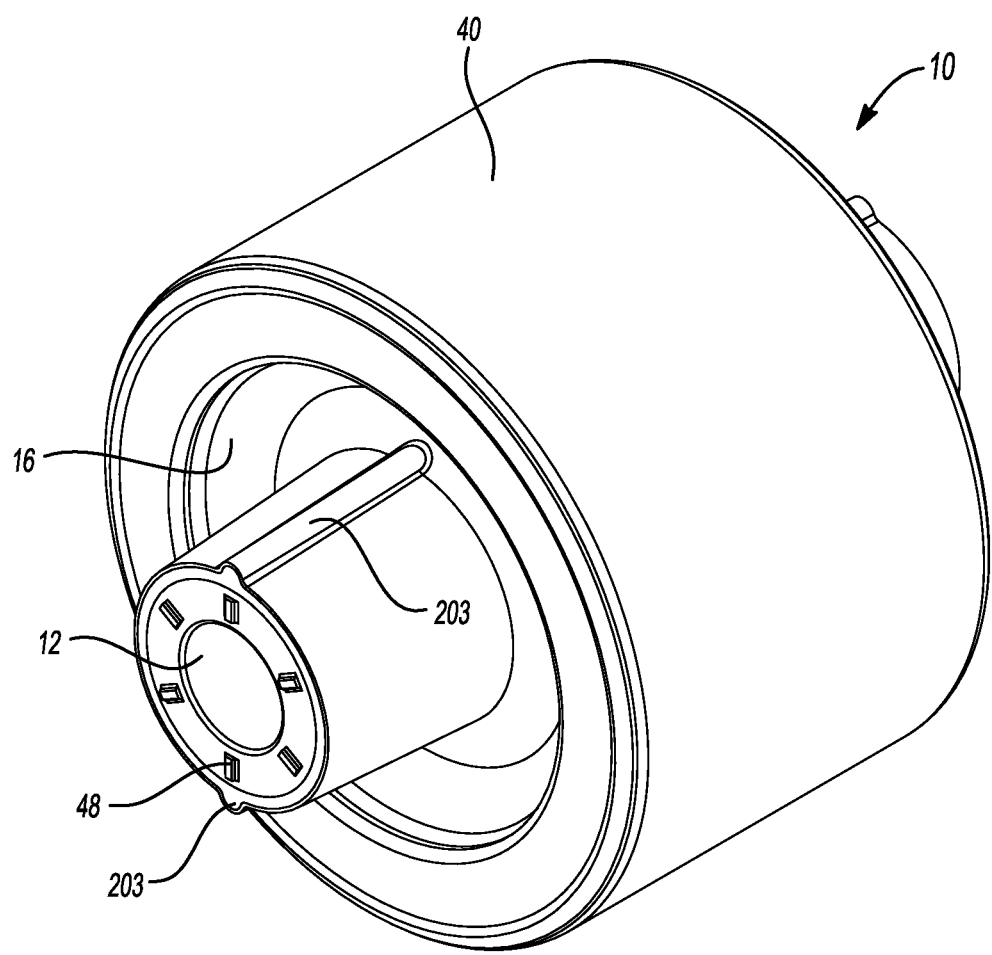
FIG. 1 is a perspective view of a hydraulic bushing assembly in accordance with one embodiment of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
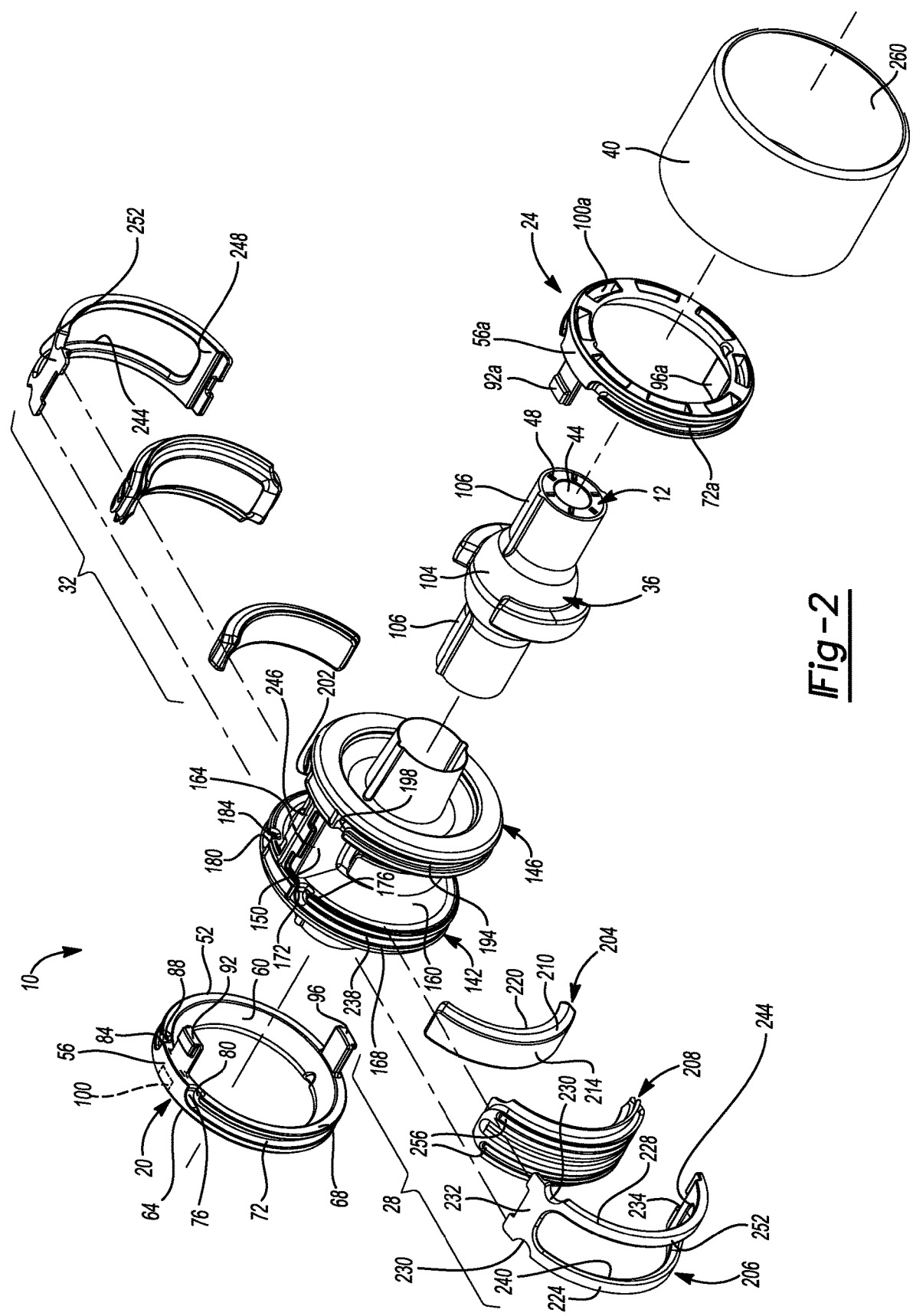
FIG. 2 is an exploded perspective view of the hydraulic bushing assembly illustrated in FIG. 1.
Figure 3:
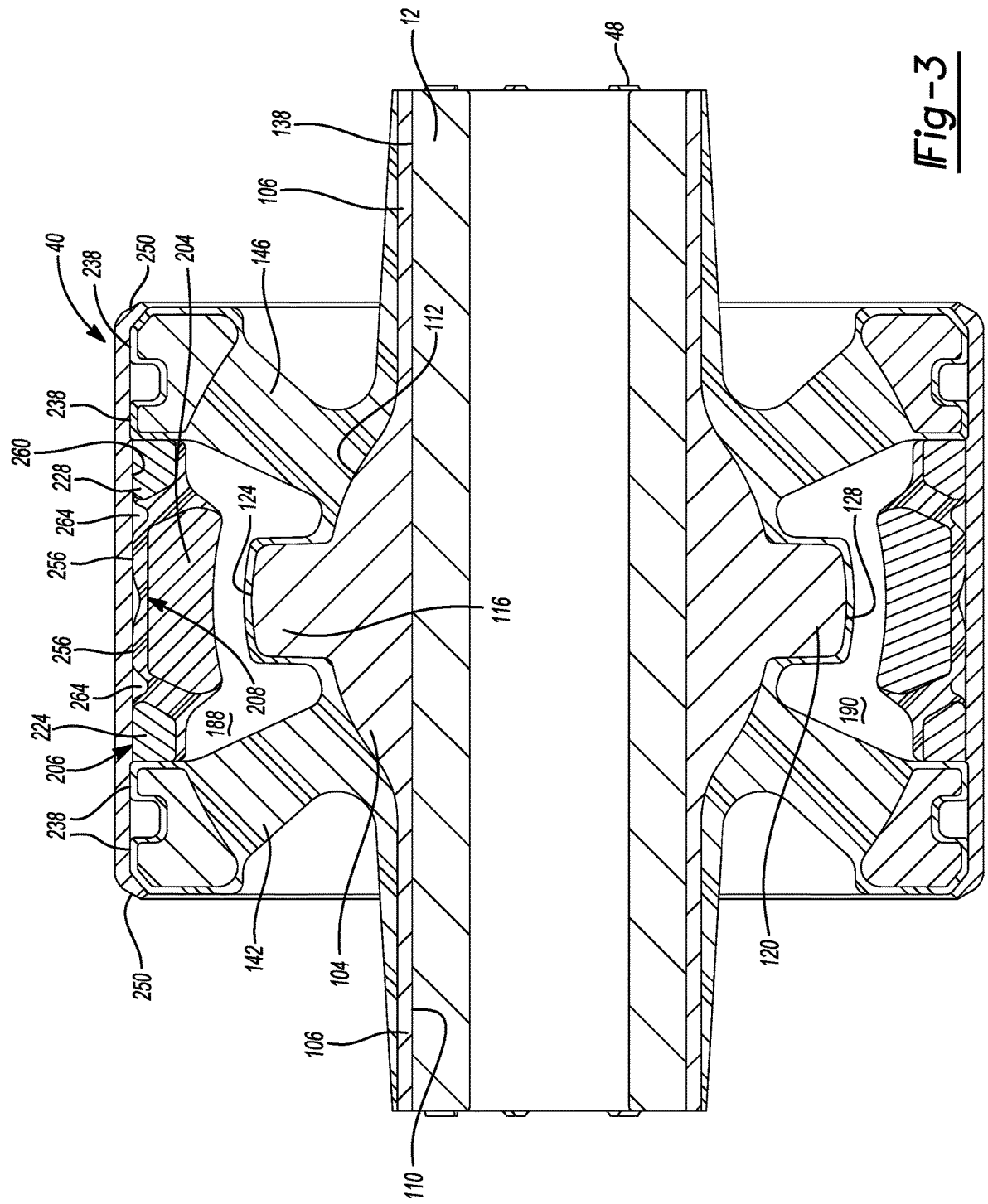
FIG. 3 is a cross-sectional view of the hydraulic bushing assembly illustrated in FIG. 1.

FIGS. 1-3 illustrate a hydraulic bushing assembly which is designated generally by reference numeral 10. Hydraulic bushing assembly 10 comprises an inner tube 12, an elastomeric bushing 16, a first intermediate insert 20, a second intermediate insert 24, a first snubber 28, a second snubber 32, a travel limiter 36, and an outer tube 40.

Inner tube 12 is a metallic member preferably constructed from mild steel such as SAE J403 1008-1010. Inner tube 12 includes a through bore 44 for receipt of a fastener (not shown) to interconnect hydraulic bushing assembly 10 to a vehicle component such as a suspension control arm. A plurality of circumferentially spaced apart castellations 48 extend from either end of inner tube 12. Castellations 48 may cooperate with an adjacent member to which hydraulic bushing assembly 10 is coupled to assist in alignment and maintaining rotational position of inner tube 12. As some portions of inner tube 12 may be exposed to the environment, the exterior surfaces of inner tube 12 may be treated with a Zn—Ni plating.

First intermediate insert 20 and second intermediate insert 24 are identical to one another. As such, only first intermediate insert 20 will be described in detail. Similar features on second intermediate insert 24 will be identified with an "a" suffix. First intermediate insert 20 includes a ring shaped body 52 having an outer cylindrical surface 56, an inner surface 60, an outer end face 64 and an inner end face 68. Both first intermediate insert 20 and second intermediate insert 24 are constructed from either a plastic material such as nylon PA6 that may be reinforced and designated as 35% glass filled or an aluminum die casting alloy.

A channel 72 circumferentially extends along outer cylindrical surface 56 for a majority of the circumferential extent of body 52. Channel 72 includes a first axially extending portion 76 that extends to inner end face 68 to define a first port 80. Channel 72 includes a second axially extending portion 84 that extends to inner end face 68 to define a second port 88. A pair of diametrically opposed tabs 92, 96 axially extend from inner end face 68. A plurality of recesses 100 axially extend into body 52 from outer end face 64. Each of first intermediate insert 20 and second intermediate insert 24 are entirely encapsulated within elastomeric bushing 16. Molten elastomeric material fills recesses 100 during the over-molding process to enhance the structural interconnection and maintain the desired relative position between the other over molded components and the elastomeric bushing 16.

Second intermediate insert 24 is positioned in an opposed mirror orientation to first intermediate insert 20 such that tabs 92 and 92a are axially aligned with one another. Tabs 96 and 96a are also axially aligned with one another.

Travel limiter 36 may be constructed as an injection molded plastic component bonded to an external surface 138 of inner tube 12. Travel limiter 36 includes a body portion 104 with two integrally formed thin-wall cylindrical portions 106 positioned on opposite sides of body portion 104. A cylindrically shaped through bore is defined by an inner surface 110. An outer surface 112 of body portion 104 is substantially spherically shaped. A pair of diametrically opposed protrusions 116, 120 radially outwardly extend from outer surface 112. Each protrusion 116, 120 includes a spherically shaped contact surface 124, 128, respectively. Travel limiter 36 may be formed from a plastic material similar to or different from the material used to construct first intermediate insert 20 and second intermediate insert 24. In the instant example, travel limiter 36 is also constructed from a 35% glass-filed nylon PA6.

In an exemplary method of manufacturing hydraulic bushing assembly 10, travel limiter 36 is injected molded and simultaneously bonded to inner tube 12 to define a sub-assembly. Subsequently, each of first intermediate insert 20, second intermediate insert 24 and the sub-assembly of inner tube and travel limiter 36 are placed into an injection mold in a spaced apart relationship. Liquid elastomer is injected into the mold to bond each of the previously listed components to one another. Once solidified, elastomeric bushing 16 includes a first flange 142 and a second flange 146 integrally formed with and radially outwardly extending from travel limiter 36. A first web 150 and a second web 154 longitudinally extend to interconnect first flange 142 with second flange 146. Each of first web 150 and second web 154 radially outwardly extend from travel limiter 36. First flange 142, second flange 146, inner portion 134 and first and second webs 150, 154 cooperate with one another to define a first cavity 160 and a diametrically opposed second cavity 164.

First flange 142 includes a circumferentially extending channel 168 that extends for a majority of the circumferential extent of first flange 142. Channel 168 includes a first axially extending portion 172 that defines a first port 176 in communication with first cavity 160. Channel 168 includes a second axially extending portion 180 that defines a second port 184 in fluid communication with second cavity 164. When hydraulic bushing assembly 10 is completely assembled, first cavity 160 and second cavity 164 in cooperation with first snubber 28 and second snubber 32 define a first fluid chamber 188 and a second fluid chamber 190.

Second flange 146 is substantially the mirror image of first flange 142 and includes a channel 194. Channel 194 circumferentially extends to define a third port 198 in fluid communication with first fluid chamber 188 and a fourth port 202 include fluid communication with second fluid chamber 190. Channel 168 provides fluid communication between first fluid chamber 188 and second fluid chamber 190 via first port 176 and second port 184. Based on the fluid paths described and the non-rigid nature of elastomeric bushing 16, fluid flow occurs between first fluid chamber 188 and second fluid chamber 190 during relative movement between inner tube 12 and outer tube 40. The flow of fluid between fluid chambers 188, 190 through channels 168, 194 creates a mass-damper effect within hydraulic bushing assembly 10.

Elastomeric bushing 16 includes a plurality of beads 238 circumferentially extending about its outer surface shaped and sized to sealingly engage inner surface 260 of outer tube 40 and fully define the fluid passageways comprising channels 168, 194. Axially extending beads 246 radially outwardly protrude from first web 150 and second web 154 to sealingly engage inner surface 260 of outer tube 40 and define fluid chambers 188, 190.

Elastomeric bushing 16 may further include radially outwardly extending ribs 203 (FIG. 1). Ribs 203 are diametrically opposed and positioned at an angular orientation associated with the rotational position of first and second webs 150, 154. Ribs 203 offer a visual indication of the position of the components within hydraulic bushing assembly 10 after the component has been completely constructed. Ribs 203 may cooperate with mating features in an adjacent vehicle component to properly align travel limiter 36 in relation to the direction of expected maximum loading.

First snubber 28 and second snubber 32 are substantially similar to one another. As such, only first snubber 28 will be described in detail. First snubber 28 includes an inner snubber 204, an outer snubber 206, and a cushion 208 positioned therebetween. Inner snubber 204 is substantially semicircular in shape having a curved wall 210 with an outer surface 214 and an inner surface 220. Inner surface 220 is substantially spherically-shaped and may also be referred to as stop face 220. Cushion 208 is an elastomeric material which is bonded to inner snubber 204 and outer snubber 207. Liquid elastomer is injected into the mold to bond each of the previously listed components to one another.

Outer snubber 206 is shaped as a curved open frame having a first leg 224 spaced apart from a second leg 228. A first web 232 interconnects ends of first and second legs 224, 228. A second web 236 interconnects the opposite ends of legs 224, 228. Legs 224, 228 and webs 232, 236 define an open window 240. A recess 244 circumferentially surrounds a window 240 and radially extends from an inner surface 248 of outer snubber 206. Outer snubber 206 includes an opposite outer surface 252.

Cushion 208 is sized and shaped to fill window 240 and be positioned within recess 244. Window 240 is sized to be larger than inner snubber 204. As such, loads applied to inner surface 220 of inner snubber 204 pass through cushion 208 and are reacted by outer tube 40. As best depicted in FIG. 3, cushion 208 includes ribs 256 that are placed in compression and in direct engagement with an inner surface 260 of outer tube 40. Gaps 264 exist between portions of cushion 208 and outer tube 240 to provide volumes for cushion 208 to fill if required during high-load conditions.

It should be appreciated that outer surface 252 of outer snubber 206 directly engages inner surface 260 of outer tube 40. In the embodiment including window 240, the surface contact area of cushion 208 with inner surface 260 is greater than the area of outer surface 252 of outer snubber 206 in contact with surface 260 of outer tube 40. In addition, the surface contact area between inner snubber 204 and either of protrusions 116, 120 is less than the surface contact area between cushion 208 and outer tube 40. This geometrical arrangement provides a reduction in contact stress and unit loading of the elastomeric cushion 208. A higher load capacity for a given bushing size may be achieved. The tendency for cushion 208 to rupture or otherwise be compromised could also be minimized by the described arrangement.

Each of first snubber 28 and second snubber 32 includes scallops 230 through which fluid flows during a fluid transfer between first fluid chamber 188 and second fluid chamber 190. A groove 234 is formed at one end of each first and second snubber 28, 32 for engagement with a respective portion of elastomeric bushing 16 to properly aligned the first and second snubbers 28, 32 within first cavity 160 and second cavity 164, respectively.

Figure 4:
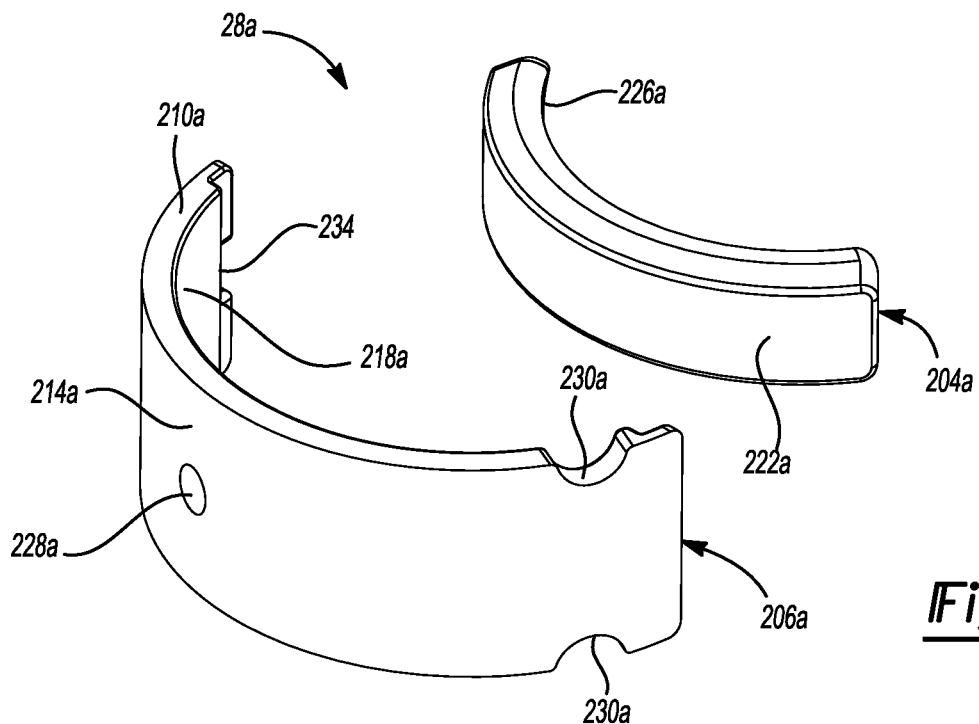
FIG. 4 is an exploded perspective view of an alternate embodiment snubber.
Figure 5:
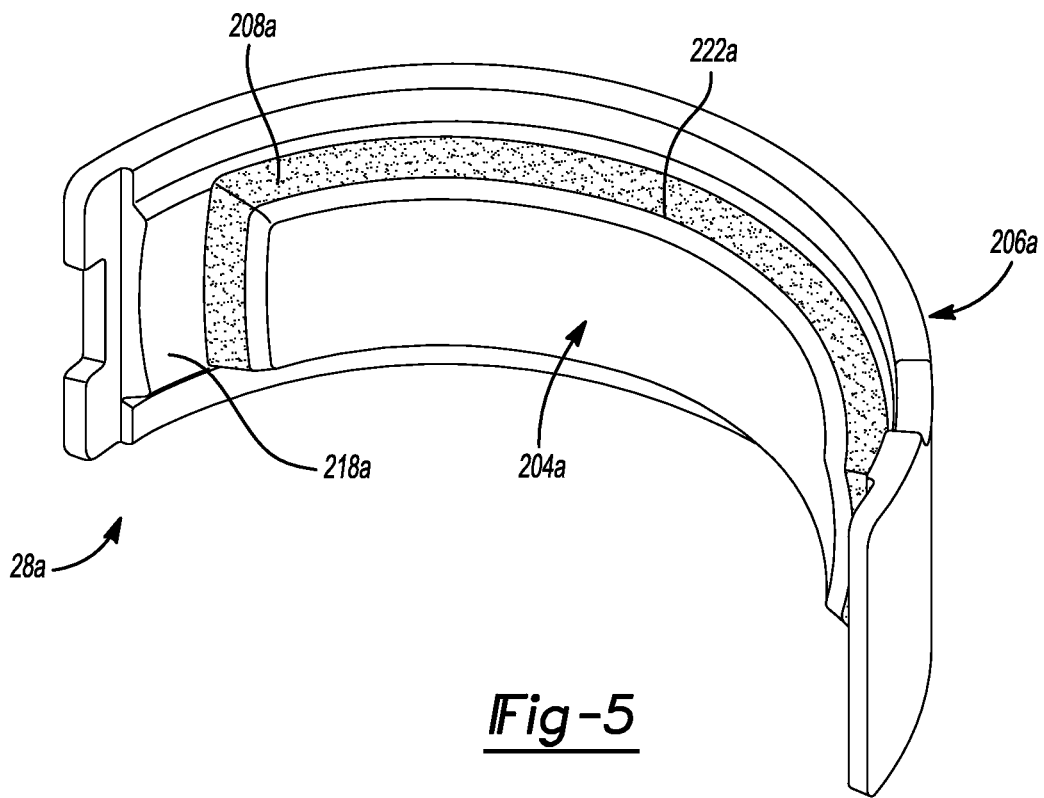
FIG. 5 is a perspective view of the alternate embodiment snubber.

FIGS. 4 and 5 depict a second embodiment snubber 28a. First snubber 28a and a second snubber, not shown, are substantially similar to one another, if not identical. Accordingly, only first snubber 28a will be described in detail. Similar elements will be identified with the same reference numerals. First snubber 28a includes an inner snubber 204a, an outer snubber 206a and a cushion 208a positioned therebetween. Outer snubber 206a is substantially semicircular in shape having a curved wall 210a with an outer surface 214a and an inner surface 218a. Inner snubber 204a includes an outer surface 222a. Cushion 208a is an elastomer, such as rubber, bonded to inner surface 218a of outer snubber 206a and outer surface 222a of inner snubber 204a. An optional aperture 228a extends through curved wall 210a. Aperture 228a is filled with molten elastomer during the injection molding process when inner snubber 204a is bonded to outer snubber 206a via cushion 208a. Spherically-shaped stop face 226a circumferentially extends along the inner radially extent of inner snubber 204a. Inner snubber 204a and outer snubber 206a may be constructed from a plastic material as previously described or alternatively from aluminum or an aluminum alloy.

Figure 6:
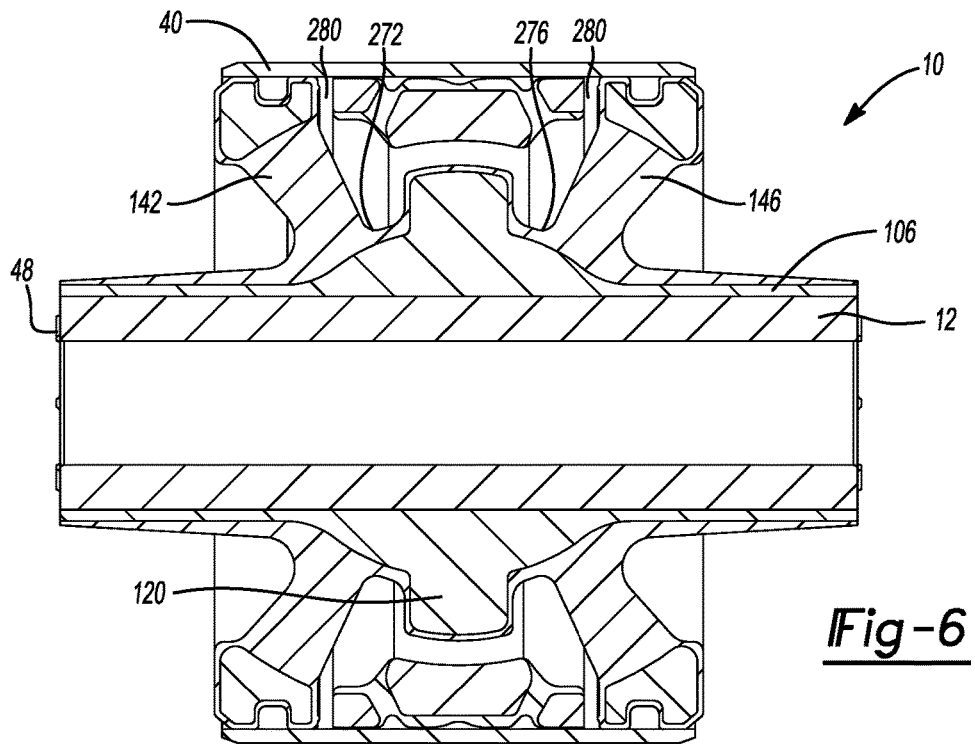
FIG. 6 is a cross-sectional view of the hydraulic bushing illustrated in FIG. 1 in a free and unloaded state.
Figure 7:
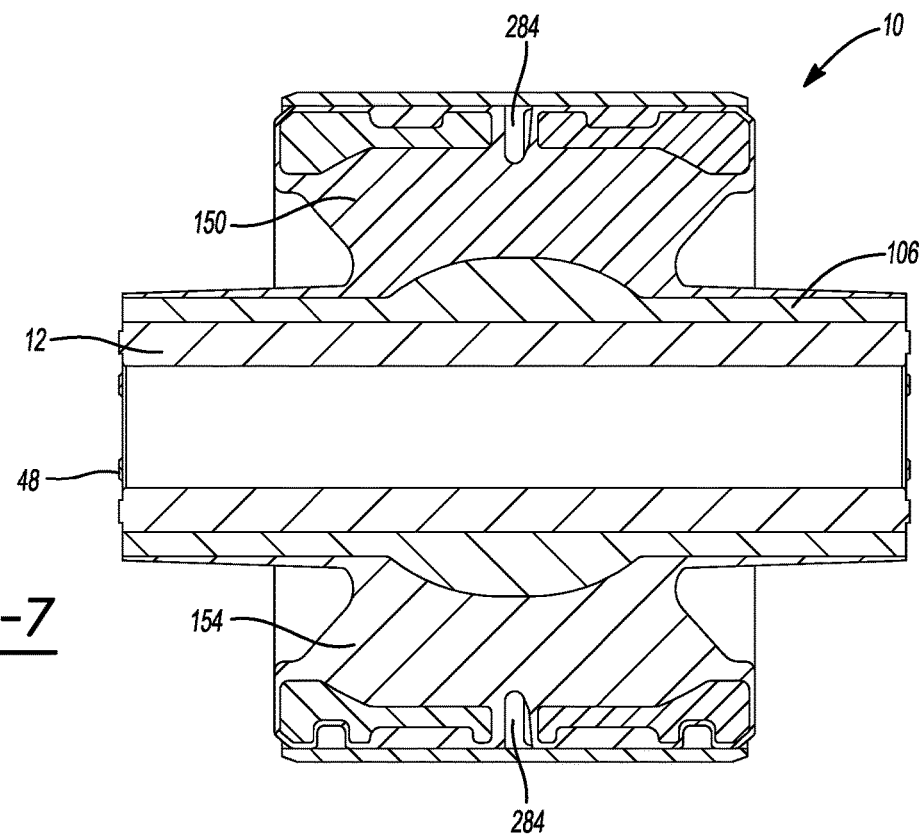
FIG. 7 is another cross-sectional view of the hydraulic bushing illustrated in FIG. 1 in a free and unloaded state.

With reference to FIGS. 6 and 7, elastomeric bushing 16 is depicted in a free, unloaded and pre-compressed state. After the liquid elastomer used to form elastomeric bushing 16 has solidified subsequent to the injection molding process, undesirable residual tensile stresses may exist along the external surfaces of the elastomeric bushing 16. Residual tensile stresses present at a root 272 of first flange 142 and a root 276 of second flange 146 may be of particular concern as these locations are also geometrical stress concentrations.

It should be appreciated that in the as-molded, free state, first flange 142 is splayed apart from second flange 146 a greater distance than the spacing between the first and second flanges 142, 146 when the elastomeric bushing 16 is an assembled condition as depicted in FIG. 3. FIG. 6 clearly depicts the unloaded, free state by spaces 280 that exist between first flange 142 and first snubber 28 as well as the space 280 between second flange 146 and first snubber 28. FIG. 7 is taken along a different section line cut through first web 150 and second web 154. When elastomeric bushing 16 is in the free, unloaded state, gaps 284 are provided to allow subsequent compression and movement of first flange 142 toward second flange 146.

Prior to positioning outer tube over elastomeric bushing 16, all components are submersed in a fluid. Once submersed, first snubber 28 is positioned within first cavity 160 and second snubber 32 is positioned within second cavity 164 to define fluid filled chambers 188, 190. Next, outer tube 40 is axially translated over and placed in pressed engagement with elastomeric bushing 16 and the snubbers 28, 32. First flange 142 and second flange 146 are compressed toward one another to place roots 272, 276 in compression. At this time, gaps 284 are reduced or closed completely. Spaces 280 are eliminated as first flange 142 and second flange 146 are displaced into engagement with first and second snubbers 28, 32. Distal ends 250 of outer tube 40 are mechanically curled or otherwise deflected to maintain the compressed positon of first and second flanges 142, 146 as well as a desired relative axial position of outer tube 40 relative to elastomeric bushing 16. Fluid chambers 188, 190 may be filled with any suitable liquid such as water or glycol.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A hydraulic bushing assembly comprising:
an inner tube including an outer surface;
an outer tube circumscribing the inner tube;
a travel limiter fixed to the inner tube;
an elastomeric bushing bonded to an outer surface of the travel limiter;
a snubber assembly positioned within the outer tube and spaced apart from the travel limiter when the bushing is in an unloaded state, wherein the travel limiter is operable to move into contact with the snubber assembly when the bushing is in a loaded state, the snubber assembly including an outer snubber and a spaced apart inner snubber interconnected with an elastomeric cushion, the outer snubber including a frame surrounding a window, the frame being in contact with the outer tube, the cushion extending through the window, wherein the inner snubber is aligned with the window;
first and second fluid chambers; and
a fluid passageway defined by the elastomeric bushing and the outer tube, the fluid passageway extending between the first and second fluid chambers, wherein movement of the inner tube relative to the outer tube causes fluid transfer between the first fluid chamber and the second fluid chamber.

2. The hydraulic bushing assembly according to claim 1, wherein the travel limiter includes a protrusion with a distal surface.

3. The hydraulic bushing assembly according to claim 2, wherein the snubber includes a stop face selectively engageable with the travel limiter distal surface.

4. The hydraulic bushing assembly according to claim 3, wherein the stop face and the travel limiter distal surface are spherically shaped.

5. The hydraulic bushing assembly according to claim 3, wherein the stop face is positioned in constant contact with fluid within one of the first fluid chamber and the second fluid chamber.

6. The hydraulic bushing assembly according to claim 3, wherein the stop face and the travel limiter distal surface are spherically shaped.

7. The hydraulic bushing assembly according to claim 3, wherein the stop face is positioned in constant contact with fluid within one of the first fluid chamber and the second fluid chamber.

8. The hydraulic bushing assembly according to claim 2, wherein the inner tube extends along a longitudinal axis and the protrusion radially extends within one of the fluid chambers.

9. The hydraulic bushing assembly according to claim 2, wherein the inner tube extends along a longitudinal axis and the protrusion radially extends within one of the fluid chambers.

10. The hydraulic bushing assembly according to claim 1, further comprising a first intermediate insert and a second intermediate insert spaced apart from the first intermediate insert, the elastomeric bushing encapsulating the first intermediate insert and the second intermediate insert, wherein the first insert includes a groove defining the path of the fluid passageway.

11. The hydraulic bushing assembly according to claim 1, wherein the outer tube includes at least one curled end.

12. The hydraulic bushing assembly according to claim 1, wherein the elastomeric bushing includes axially spaced apart flanges interconnected by axially extending webs, wherein each web is a portion of each of the first and second fluid chambers.

13. The hydraulic bushing assembly according to claim 1, wherein the inner tube includes a longitudinal axis, the internal snubber being radially positioned to at least partially enter the window and partially overlap the frame.

14. The hydraulic bushing assembly according to claim 1, wherein the travel limiter includes a protrusion with a distal surface.

15. The hydraulic bushing assembly according to claim 1, further comprising a first intermediate insert and a second intermediate insert spaced apart from the first intermediate insert, the elastomeric bushing encapsulating the first intermediate insert and the second intermediate insert, wherein the first insert includes a groove defining the path of the fluid passageway.

16. The hydraulic bushing assembly according to claim 1, wherein the outer tube includes at least one curled end.

17. The hydraulic bushing assembly according to claim 1, wherein the elastomeric bushing includes axially spaced apart flanges interconnected by axially extending webs, wherein each web is a portion of each of the first and second fluid chambers.

18. A hydraulic bushing assembly comprising:
an inner tube including an outer surface;
an outer tube circumscribing the inner tube;
a travel limiter fixed to the inner tube, the travel limiter being centered along the length of the inner tube and radially outwardly protruding from the inner tube;
an elastomeric bushing bonded to an outer surface of the travel limiter;
a snubber assembly positioned within the outer tube and spaced apart from the travel limiter when the bushing is in an unloaded state, wherein the travel limiter is operable to move into contact with the snubber assembly when the bushing is in a loaded state, the snubber assembly including an outer snubber and a spaced apart inner snubber interconnected with an elastomeric cushion, the outer snubber including a frame surrounding a window, the frame being in contact with the outer tube, the cushion extending through the window, wherein the inner snubber is aligned with the window, the inner snubber being centrally positioned along an axial extent of the outer tube;
first and second fluid chambers; and
a fluid passageway defined by the elastomeric bushing and the outer tube, the fluid passageway extending between the first and second fluid chambers, wherein movement of the inner tube relative to the outer tube causes fluid transfer between the first fluid chamber and the second fluid chamber.

19. The hydraulic bushing assembly according to claim 18, or in the protrusion includes a distal surface.

\* \* \* \* \*